United States Patent [19]

Beeston et al.

[11] Patent Number: 4,485,434
[45] Date of Patent: Nov. 27, 1984

[54] POWER SUPPLY FOR ARC LAMPS

[75] Inventors: Timothy W. Beeston, Hants; Laurence S. Attrill, Barnet, both of England

[73] Assignee: Lee Electric (Lighting) Limited, England

[21] Appl. No.: 397,596

[22] Filed: Jul. 12, 1982

[30] Foreign Application Priority Data

Jul. 28, 1981 [GB] United Kingdom ............... 8123254

[51] Int. Cl.³ .......................................... H02M 7/537
[52] U.S. Cl. ...................................... 363/132; 363/56; 323/266; 315/DIG. 7
[58] Field of Search ........................... 363/17, 55-56, 363/65, 71-72, 97-98, 131-132; 315/DIG. 5, DIG. 7; 323/266

[56] References Cited

U.S. PATENT DOCUMENTS

| 3,737,755 | 6/1973 | Calkin et al. | 363/17 |
| 3,976,932 | 8/1976 | Collins | 363/132 |
| 3,999,100 | 12/1976 | Dendy et al. | 315/208 X |
| 4,020,361 | 4/1977 | Suelzle et al. | 307/106 |
| 4,150,425 | 4/1979 | Nagano et al. | 363/71 X |
| 4,270,164 | 5/1981 | Wyman et al. | 363/56 |

OTHER PUBLICATIONS

R. P. Severns, "A New Current-Fed Converter Topology", PESC 79 IEEE Power Electronics Specialists Conference 1979, San Diego, CA, U.S.A., pp. 277-283.
Electronique et Applications Industrielles, No. 259, Nov. 1978, Paris (France), A. Filleau, "Application du VMOS; la Puissance d'une Nouvelle Technologie", pp. 19-24.

Primary Examiner—Peter S. Wong
Attorney, Agent, or Firm—Kirschstein, Kirschstein, Ottinger & Israel

[57] ABSTRACT

A power supply for an arc lamp comprises a power source and an inverter, the power source being a constant current source and the inverter a bridge network of field effect transistors switched by square wave pulses from an oscillator so that the output of the bridge network comprises alternating square wave pulses of equal duration for driving the lamp. The oscillator pulses are fed by way of opto-isolators to the bridge transistors. The constant current source and bridge network are provided as a power module for parallel connection with like modules and the oscillator is of modular form and serves as a common oscillator for the power modules.

12 Claims, 7 Drawing Figures

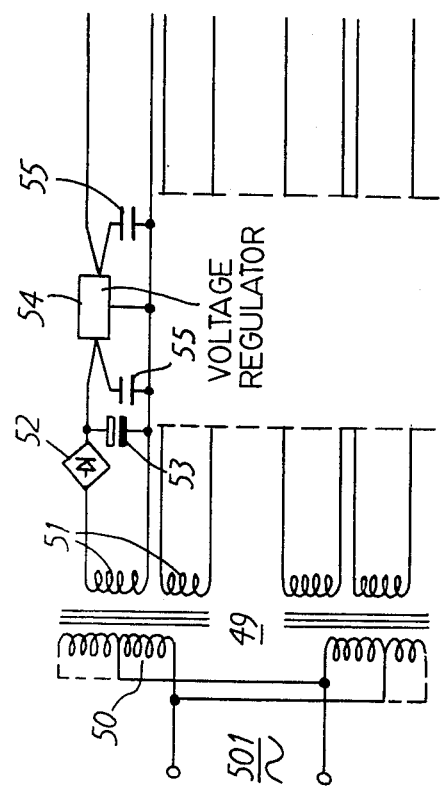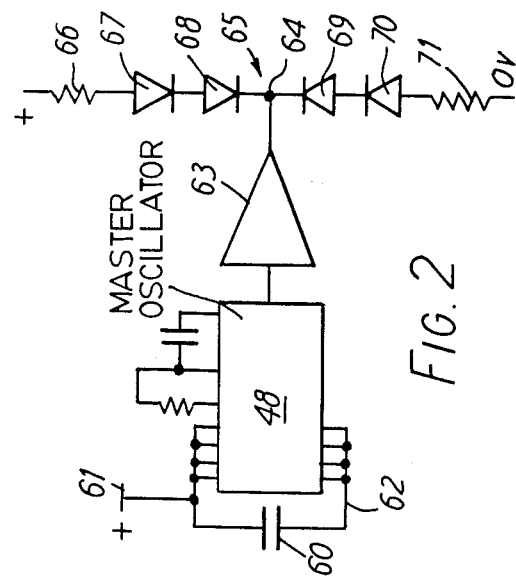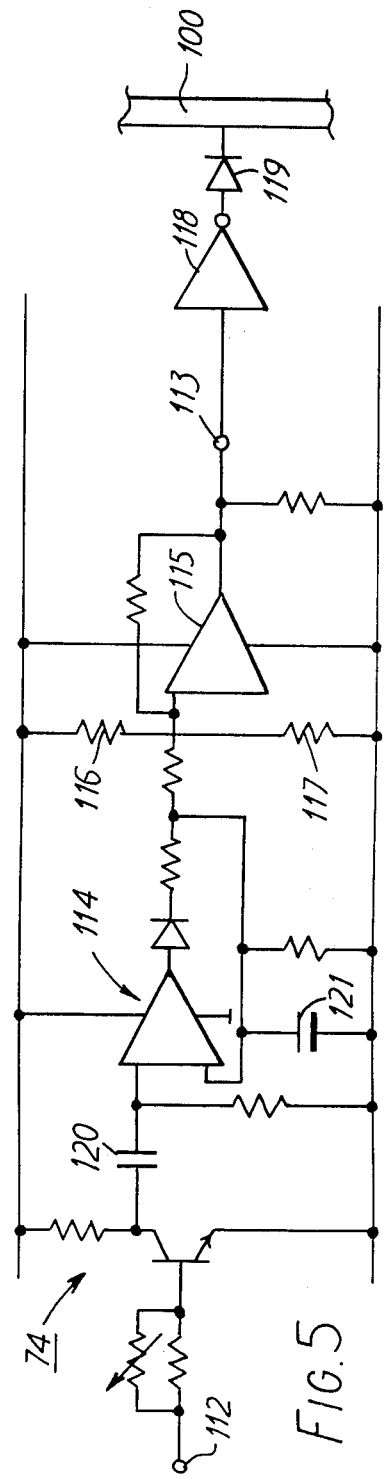

POWER SUPPLY FOR ARC LAMPS

This invention relates to power supplies for arc lamps and more particularly to a power supply for a metal halide arc lamp such as a mercury, iodine lamp, used to provide daylight and other spectrum lighting, for example, for cinematographic stages, outside television broadcasts and the like.

Arc lamps of the kind referred to are preferably driven by A.C. since D.C. drive causes rapid erosion of the lamp electrodes. If driven by a sinusoidal current waveform the lamp produces a white light level which is modulated rather than constant as required. This effect arises because, as the supply current passes through zero, the arc gases cool and reheat, the arc being maintained by its thermal inertia, with the result that the light emission from the arc varies. If the lamp is driven by a square current waveform, the speed of passage of the current through zero is greatly increased and modulation of the light output of the arc is greatly reduced.

It is known to use a power supply for a metal halide arc lamp which consists of a bridge network of switching transistors to provide a square current waveform for driving the arc, the bridge being connected to the supply by way of a series bank of resistors, the supply being either a D.C. generator or a rectified mains supply. Such a power supply is of appreciable bulk primarily because of the size of heat sinks required to dissipate heat generated in the resistor bank and is for that reason expensive to construct. Transportation of the power supply to the location where it is used, moreover, is tedious and expensive.

The present invention consists in a power supply for an arc lamp, comprising a power source and an inverter, characterized in that the power source is a constant source for the supply of current to the inverter and comprises, connected in series, a rectifier, a capacitor, an inductor and a field effect transistor, the inverter being connected in parallel with said capacitor so that current supplied from the rectifier to the inverter is drawn through said inductor by said field effect transistor, there being provided a chopper oscillator for controlling conduction of said field effect transistor and means connected to said oscillator and responsive to the current in said field effect transistor so that said oscillator is inhibited to terminate conduction of said field effect transistor when the current therethrough exceeds a predetermined value, whilst the inverter comprises a bridge network of field effect transistors and an oscillator adapted to supply square wave switching pulses to the bridge transistors, whereby the bridge network affords an output current of alternating square pulses of current of equal duration for driving the lamp.

Suitably, the field effect transistors are insulated gate devices supplied with gate to source voltages by way of opto-isolators from the oscillator.

Advantageously, the constant current source and bridge network are mounted on a single circuit board and constitute a power module for parallel connection of the current source input terminals and bridge network output terminals with corresponding terminals of one or more further like power modules. Also with advantage the oscillator for the supply of square voltage switching pulses to the bridge network is mounted as a module on a circuit board which is adapted for connection to the power modules to serve as a common oscillator for the field effect transistor bridge networks thereof. Suitably, the common oscillator module further carries a plurality of system protection circuits, a supply circuit for supplying stabilised voltages to the constant current source, the common oscillator, the bridge network and the protection circuits, and a control circuit adapted upon triggering of any of the protection circuits to disconnect the mains power supply from the power modules.

The power supply according to the invention represents a considerable saving in weight as compared with the prior art arrangements and is cheaper to construct. It can be used without modification of the electronic circuitry with normally available power sources such as 110 volts 60 cycles per second, and 220 volts 50 cycles per second and 120 volts D.C. The modular construction and ability to connect modules in parallel makes the invention readily adaptable for use with lamps of different power. As compared with switching power transistors of the junction type as used in prior arrangements, the use of field effect transistors considerably simplifies the circuitry and enables the modular concept to be implemented with less difficulty than would be the case with bridge circuits employing junction transistors. Junction transistors have considerable disadvantages as compared with field effect transistors when used in an inverter bridge of a power supply. Thus, field effect transistors conduct when a voltage is applied between their gate and source terminals and need only a buffer stage between an oscillator supplying that voltage and the gate and source terminals. Bipolar junction transistors on the other hand require relatively high drive current to bring them into full conduction and further require special protection to guard against secondary breakdown and thermal runaway. The drive circuitry for the field effect transistors is accordingly considerably simplified as compared with that of bipolar transistors and lower switching losses are entailed when field effect transistors are employed. These advantages are achieved moreover with a high power handling capability.

The invention will now be described, by way of example, with reference to the accompanying drawings, in which:

FIG. 2, is a master oscillator circuit for supplying firing pulses to elements of a bridge circuit forming part of FIG. 1;

Figure 1A:
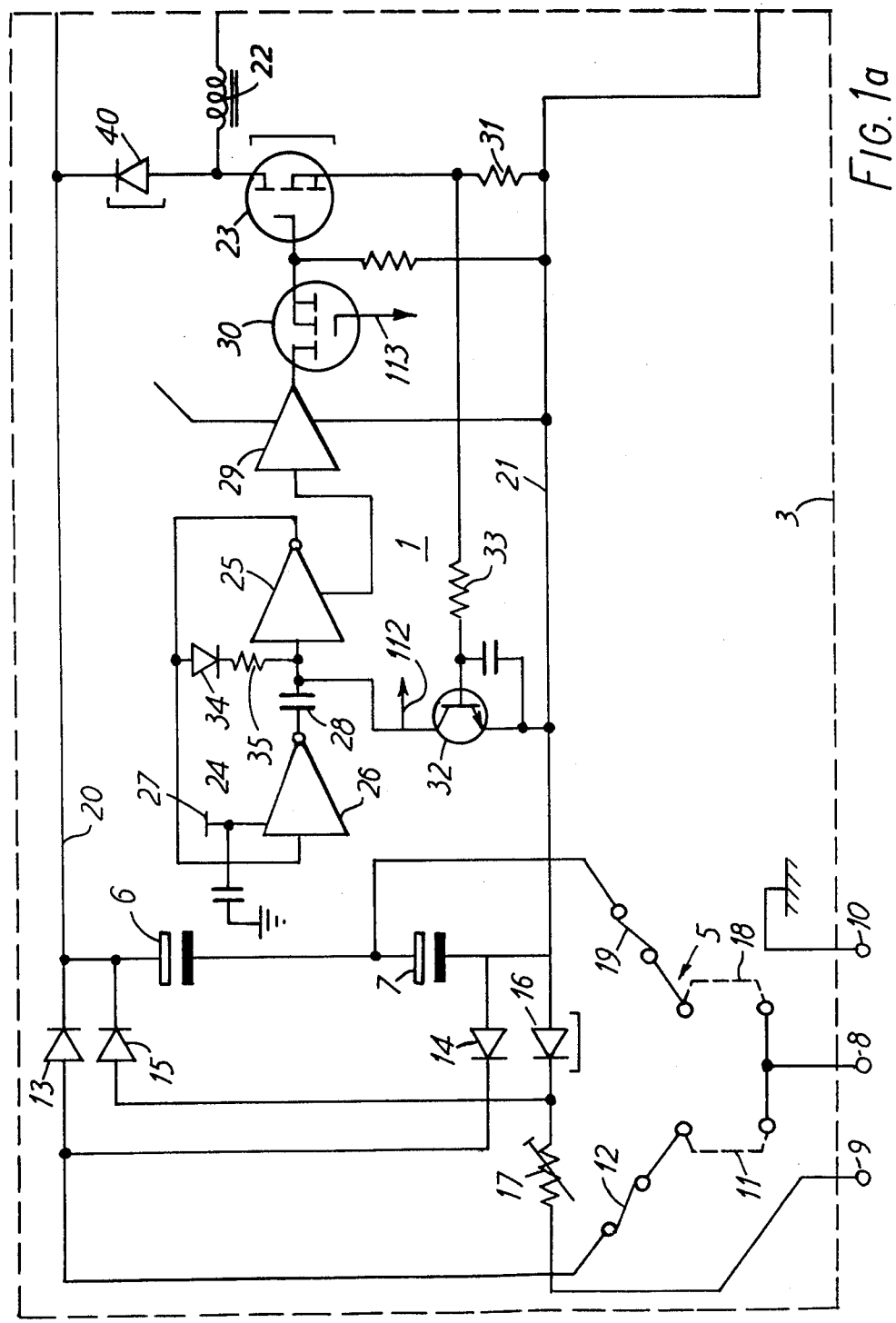
FIGS. 1a and 1b are electrical circuit diagrams of a power supply for a metal halide lamp, such as a mercury, iodine lamp.
Figure 1B:
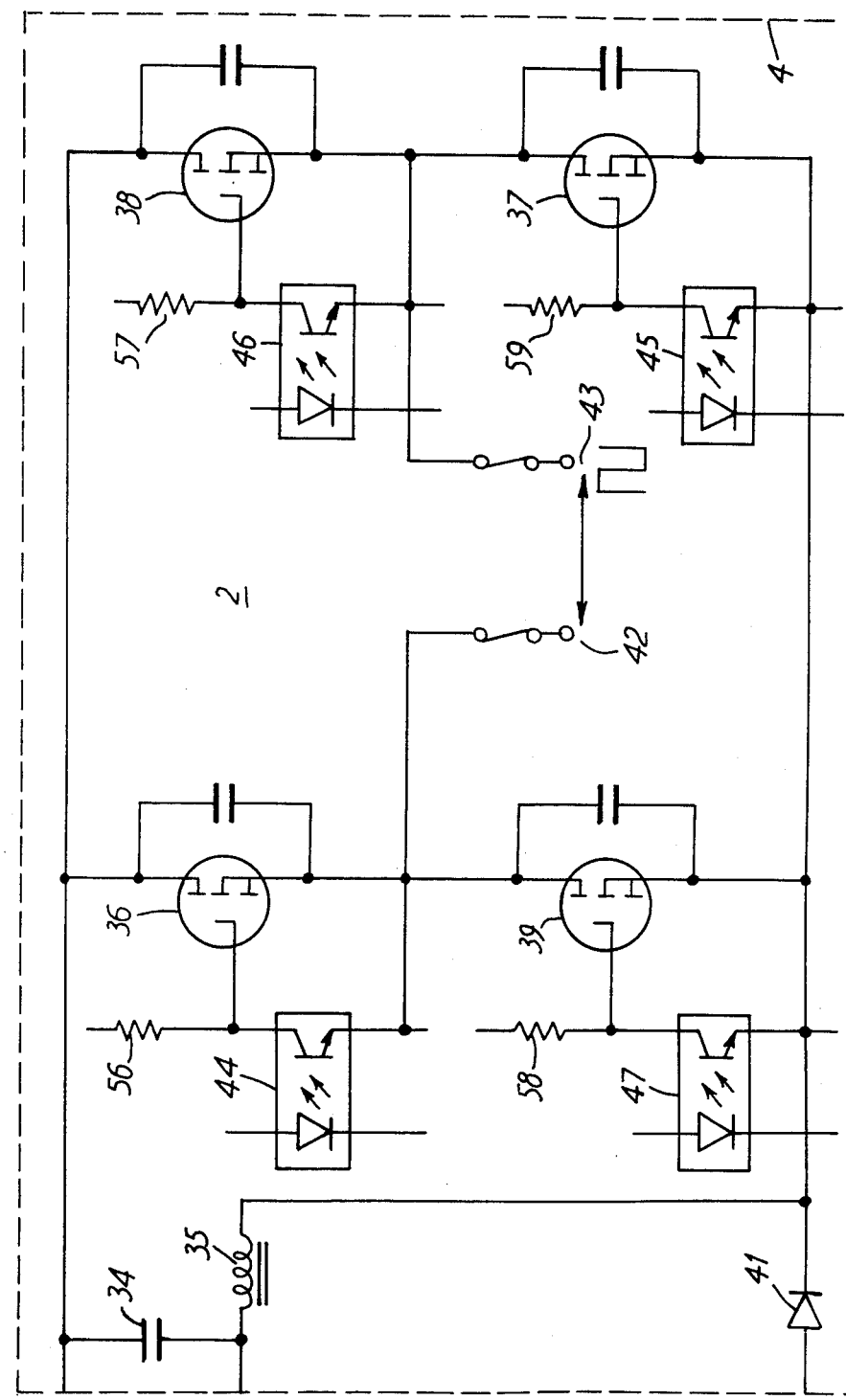
Figure 4A:
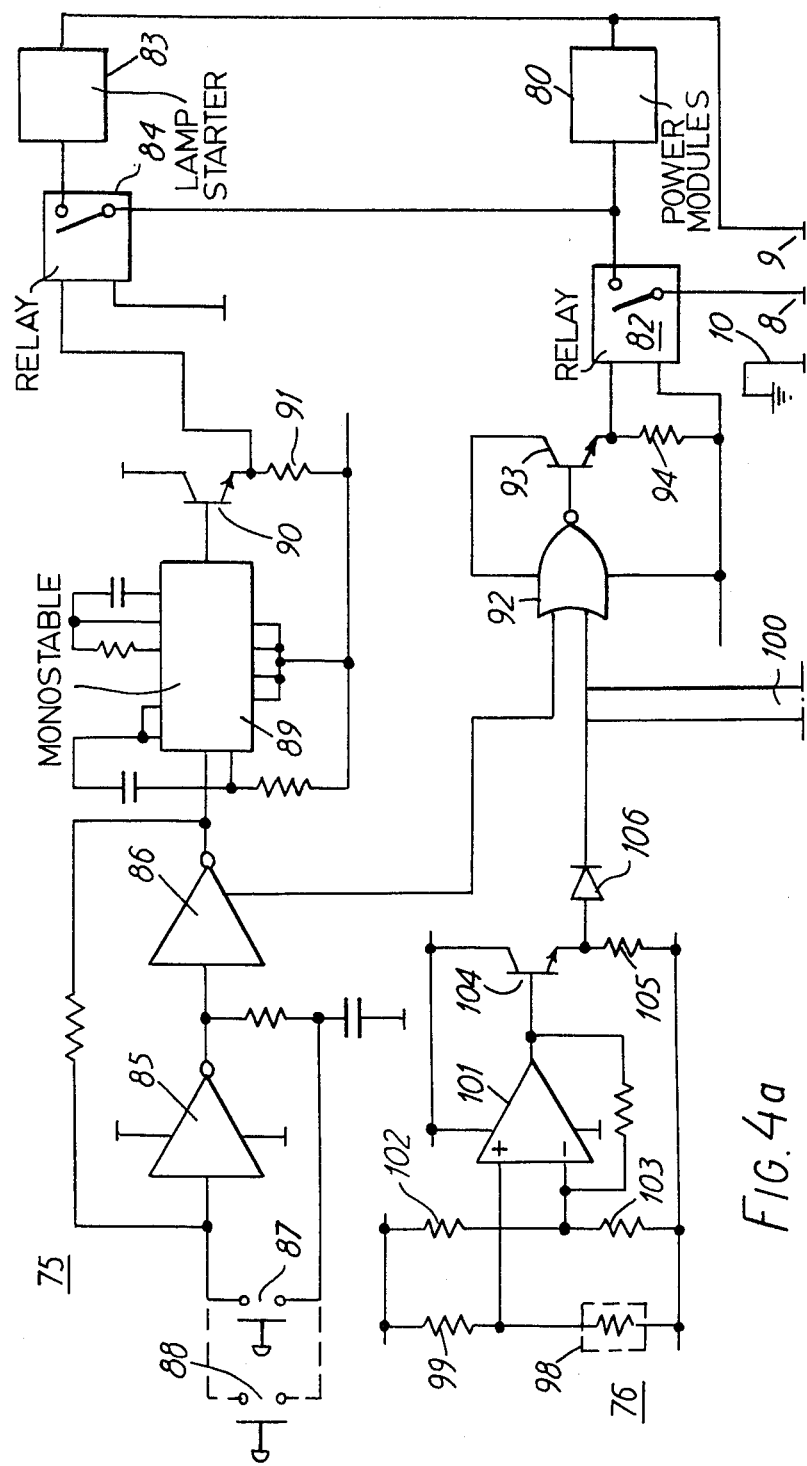
Figure 4B:
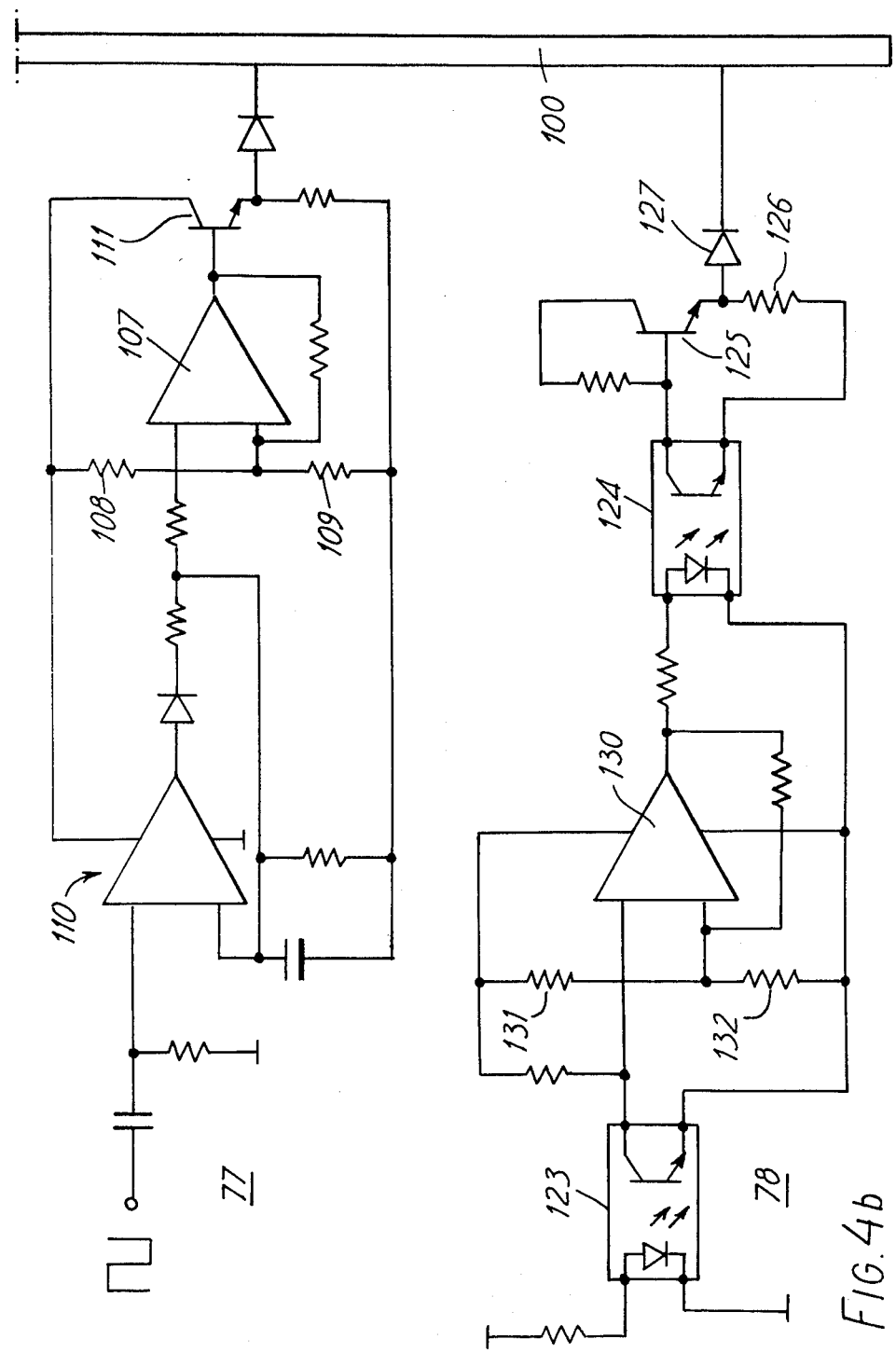

FIG. 3, is a circuit for supplying stabilised voltages to various parts of the circuits for FIGS. 1, 2, 4 and 5; and FIGS. 4a and 4b and 5 are protection circuits for ensuring fail-safe operation of the circuit of FIG. 1 in a variety of circumstances.

Referring first to FIG. 1, the power supply circuit therein illustrated consists of a constant current source 1 contained in the area enclosed by broken lines 3 and a bridge inverter circuit 2 enclosed by broken lines 4.

The constant current source 1 consists of a power supply 5 adapted for use with 110 volt or 220 volt, 50 Hertz supplies and to that end comprises two series connected smoothing capacitors 6 and 7 across which the D.C. output voltage of the power supply 5 is developed. Input terminals of the supply 5 comprise live, neutral and earth terminals 8, 9 and 10 respectively, of which terminal 10 is connected to the casing in which the circuits illustrated in the drawings are accommodated. Live terminal 8 is connected by way of a 220 volt link 11, fuse 12 and diode 13 to the side of capacitor 6 remote from the common point thereof with capacitor 7 and by way of link 11 fuse 12 and diode 14 to the side of capacitor 7 remote from the common point thereof with capacitor 6. To the side of capacitor 6 to which diode 13 is connected is also connected a diode 15 which connects with neutral terminal 9 by way of a thermistor 17. A diode 16 is also serially connected by way of the thermistor 17 between terminal 9 and the side of capacitor 7 to which is connected diode 14 and a diode 15 is connected to the common point of diode 16 and thermistor 17. The diodes 13,14,15 and 16 are poled to form a diode bridge rectifier network the input of which consists of the live and neutral terminals 8 and 9 whilst the output comprises the series connected capacitors 6 and 7.

Thus it will be apparent that the capacitors are charged in series in the same direction during each half cycle of the 220 volt supply. The thermistor 17 has a high resistance at low temperature and thus serves to limit surge currents at start up.

The live terminal 8 is also connected by a 110 volt link 18 and fuse 19 to the common point of capacitors 6 and 7. Thus during one half cycle of the 110 volt supply capacitor 7 is charged via diode 16 and thermistor 17 and during the next half cycle capacitor 6 is charged by way of thermistor 17 and diode 15. Accordingly irrespective of which of the links 11 and 18 is in circuit, the series voltage of the output capacitors 6 and 7 is substantially the sum of the fully charged voltages of those capacitors and constitutes the D.C. rectified output voltage provided at rails 20 and 21 of the constant current source 1. The rails 20 and 21 supply a choke 22 through which current can be drawn by a field effect transistor 23 of the insulated gate type. The transistor 23 is driven by a chopper oscillator 24 which consists of stages 25 and 26 and constitutes a known form of digital integrated circuit (typically RCA COS/MOS type CD 4041A). The oscillator is supplied by a 12 volt voltage rail 27 and positive feedback is afforded by capacitor 28. The gate to source voltage of the field effect transistor 23 is supplied from the oscillator 24 by way of a buffer stage 29 and a field effect transistor 30, the latter forming part of the chopper oscillator failure detection circuit hereinafter referred to with reference particularly to FIG. 5.

Current drawn by conduction of field effect transistor 23 through choke 22 by way of the load comprising bridge circuit 2 establishes a voltage at the output of transistor 23 across resistor 31 which is sensed at the base of n-p-n transistor 32 which is connected to the common point of resistor 31 and transistor 23 by way of a resistor 33. The transistor 32 has its collector to emitter path disposed in series between a series path consisting of diode 34 and resistor 35 and low voltage rail 21 so that when transistor 32 conducts voltage at the end of resistor 35 connected with transistor 32 is reduced and the chopper oscillator is thus inhibited. Accordingly, it will be seen that if excess current is drawn through the choke 22 by the transistor 23, a voltage appears across resistor 31 which renders that transistor conducting thus inhibiting the oscillator 24 with the result that the transistor 23 is rendered non-conducting in which state the voltage across resistor 31 falls to zero and the transistor 32 ceases to conduct and the oscillator again supplies the requisite gate to source voltage to transistor 23 for the latter to recommence conduction. In this way the current drawn through the choke 22 is kept sensibly constant though with a small amount of ripple attributable to the switching frequency of the chopper oscillator 24. This ripple is smoothed by capacitor 34 and choke 35 at the input of the circuit 2. The choke 35 serves to protect the bridge circuit 2 by preventing the capacitor 34 from discharging into field effect transistors 36 to 39 forming that bridge circuit and it further serves to protect the chopper oscillator 24 by absorbing voltage spikes when the bridge circuit is initially switched on. Diode 40 is a free-wheel diode which maintains current flow through the choke 22 whenever transistor 23 is rendered non-conducting.

The field effect transistors 36 to 39 are connected in a bridge configuration which at its input side is disposed between rails 20 and 21. It will be noted that the rail 21 includes a diode 41 which allows negative voltage spikes to be absorbed by the main smoothing capacitor 6 and 7. Output terminals 42 and 43 of the transistor bridge are in operation connected to the metal halide lamp which comprises the circuit load. The conduction in alternate pairs 36,37 and 38,39 of the bridge transistors produces at the output terminals 42 and 43 a square wave alternating output voltage which drives the metal halide lamp load.

The transistors 36 to 39 are driven at their respective gates via opto-isolators 44 to 47 of a form known per se, each supplied at its input with voltage pulses from a master oscillator 48 shown in FIG. 2. The opto-isolators are essentially devices in which light from a light emitting diode is employed to effect conduction of a photo-transistor, as illustrated, an n-p-n transistor. Successive pulses from oscillator 48 are supplied respectively to the opto-isolators of transistor pairs 36,37 and 38,39.

In FIGS. 2 and 3 are illustrated the master oscillator circuit and the circuit for the supply of stabilised bias voltages to the rail 27 of oscillator 24 and to the gates of the transistors 36 to 39. The circuit of FIG. 3 consists of a transformer 49 having parallelled primary windings 50 supplied from an alternating mains source 501. A number of secondary windings 51 are provided each of which is connected in series with a full wave diode rectifier 52, the series arrangement of the rectifier 52 and winding 51 being connected in parallel with a smoothing capacitor 53 across which is connected a voltage regulator circuit 54 of known form provided at its input and output sides with decoupling capacitors 55. The output sides of the voltage regulators 54 associated with three individual secondary windings 53 provide stable voltage a first of which is supplied across the series path of resistor 56 connected to the gate terminal of transistor 36 and the opto-isolator 44, a second of which is similarly applied to the series path of resistor 57 and opto-isolator 46 of transistor 38, whilst the third is applied both to the series path of resistor 58 and opto-isolator 47 of transistor 39 and to the series path of resistor 59 and opto-isolator 45 of transistor 37. A further voltage regulator 54 has the stabilised voltage output thereof applied across rail 27 of oscillator 24 and rail 21 and to various locations of the circuits of FIGS. 2, 4 and 5.

The master oscillator 48 of FIG. 2 is a free running astable multivibrator, (suitably, digital integrated circuit package RCA Type CD 4047) connected in oscillator mode and including positive feed back capacitor 60. The oscillator is provided between rails 61 and 62 with a stable voltage from the output side of one of the regulators 54. The output side of the oscillator 48 connects via a buffer stage 63 with the mid-point 64 of a chain 65 of components across which chain is supplied a stable voltage from the output side of one of the voltage regulators 54. The chain consists of series connected components, namely resistor 66 diodes 67,68,69 and 70 and resistor 71, the mid-point 64 of the chain being the common point of diodes 68 and 69. The voltages across diodes 67,68,69 and 70 provide the respective input voltages of the opto-isolators 44,45,46 and 47.

The output of the oscillator 48 comprises a series of half-cycle pulses so that the circuit affords a precise fifty percent duty cycle oscillator running at 160 Hertz. When the output of the master oscillator is high, diodes 67 and 68 are non-conducting whilst diodes 69 and 70 are conducting so that transistors 38 and 39 conduct. Similarly, when the output of the oscillator 48 is low, diodes 67 and 68 conduct whilst diodes 69 and 70 are non-conducting so that transistors 36 and 37 conduct. The metal halide arc lamp connected between the terminals 42 and 43 is thus supplied with alternating square wave current pulses of precisely equal duration.

The protection circuitry for the system is illustrated in FIGS. 4 and 5. FIG. 5 illustrates a chopper oscillator i.e. oscillator 24, failure detection circuit 74 whilst FIG. 4 illustrates a start/stop latch circuit 75, an over-temperature detection circuit 76, a master oscillator failure detection circuit 77, and, a circuit 78 for detecting failure of the stabilised voltage supply circuit of FIG. 3.

In FIG. 4 a number of power modules 80, hereinafter more fully referred to, each consisting of the circuits contained in the broken lines 3 and 4 of FIG. 1 are connected in parallel and the parallel arrangement is connected in series with a relay 82 to the mains supply. The number of parallel connected power modules is governed by the power requirements of the lamp being supplied.

In parallel with the power modules 80 are connected in series a lamp starter 83 and relay 84. The relay 84 is energised from the latching circuit 75 which comprises a set/reset bistable latch and consists of two series connected gates 85 and 86. Across the input of gate 85 is a push button switch 87, having in parallel therewith and remote therefrom, a further push button switch 88. The output of gate 86 is fed to a monostable circuit 89 at the output of which is the base of an n-p-n transistor 90 the emitter collector path of which is connected in series with a resistor 91 the voltage across which energises relay 84. Across the series path of the transistor 90 and resistor 91 and across the gate 85 is connected the stabilised voltage output of one of the voltage regulators 54 (see FIG. 3). The gate 86 has a connection to one input of a NOR gate 92 across which is connected the stabilised voltage output of one of the voltage regulators 54. The output of the gate 92 is connected to the base of an n-p-n transistor 93, the emitter collector path of which is connected in series with a resistor 94 the voltage across which energises relay 82. The stabilised voltage of one of the voltage regulators 54 is connected across the series path of the transistor 93 and resistor 94. A second input of the NOR gate is connected to a fail safe busbar 100 to which are connected outputs of the circuits 74,76,77,78.

At the commencement of operation both inputs of NOR gate 92 are low and the output of that gate is therefore high so that relay 82 is energised and its contacts are closed. Upon depressing push button 87 or 88, the output voltage level of gate 86 is raised—though the voltage at the connection of gate 86 with gate 92 is taken low—and this triggers the monostable circuit 89 the output voltage level of which goes high for a period which energises the starter 83 for a period long enough to strike the lamp connected to modules 80. After the period of the output pulse of monostable circuit 89, the output voltage level thereof falls and relay 84 is de-energised and its contacts are opened. The next time either of buttons 87 or 88 is pressed, the voltage level at the connection between the gates 86 and 92 goes high so that the level at the output of gate 92 goes low and the contacts of relay 82 open thus depriving the power modules 80 of mains supply so that the lamp is turned off.

The temperature sensing circuit comprises a comparator 101 to a first input of which is supplied a reference voltage from the common point of resistors 102 and 103 across which is connected the stabilised output voltage of one of the voltage regulators 54. In parallel with resistors 102 and 103 are resistor 99 and series conductor temperature sensor 98, the common point of which is connected to a second input of the comparator. The output of the comparator 101 is supplied to the base of an n-p-n transistor 104 the collector-emitter path of which is connected in series with a resistor 105. The stabilised voltage output of one of the regulators 54 is supplied to the comparator and across the series path of the transistor 104 and resistor 105. The voltage developed across resistor 105 is supplied by way of a diode 106 to the fail safe busbar 100 connected to an input of the NOR gate 92.

In operation of the temperature sensing circuit the reference voltage at the first input of the comparator, at normal operating temperatures, exceeds the voltage at the second input of the comparator. When however local temperature rises above a predetermined level, the resistance of the sensor 98 rapidly falls with the result that the voltage at the second input of the comparator rises above the reference voltage. An output voltage therefore appears at the comparator which increases conduction of transistor 104 with the result that the voltage across resistor 105 increases and the voltage level at busbar 100 also increases. The output voltage level at NOR gate 92 therefore falls and relay 82 opens and interrupts the supply to the power modules 80.

The master oscillator failure detection circuit 77 consists of a comparator 107 having at one input thereof a reference voltage provided by resistors 108 and 109 the common point of which is connected to the comparator. The other input of the comparator is fed with the output voltage of a peak detection circuit 110 supplied with pulses from the master oscillator. If the master oscillator pulses cease, the output of the peak detection circuit falls below the reference voltage input of the comparator and an output appears at the comparator which renders conducting an n-p-n transistor 111 so that a voltage appears at the busbar 100 which effects opening of the contacts of relay 82. As with the circuits 75 and 76 stabilised voltage supplies to the circuit 77 are provided by the output from one of the voltage regulators 54.

The chopper oscillator failure detection circuit 74 is connected at points 112 and 113 to corresponding points on the circuit of FIG. 1 and is a similar circuit to, though of necessity a much faster operating circuit than, circuit 77. It consists of a peak detection circuit 114 fed at its input 112 with the chopper oscillator frequency. The output of circuit 114 is supplied to one input of a comparator 115 the other input of which is supplied from resistors 116 and 117 with a stable reference voltage.

The chopper oscillator frequency is a saw tooth waveform which can fail with point 112 at either high or low voltage. If the failure occurs when the voltage at point 112 is low, the condition is safe because transistor 30 is then non-conducting as oscillator 24 is inhibited by the diode 34 and resistor 35. If the oscillator fails when the voltage at point 112 is high, transistor 30 permanently conducts and this condition can lead to destruction of the chopper oscillator and of components of the bridge circuit 2. The circuit 74 prevents such an eventuality and does so in this way. When the oscillator is running, capacitor 120 couples the oscillator voltage to an input the peak detector circuit 114 and charges capacitor 121. When the oscillator fails either in the high or low voltage condition, the voltage at the input of circuit 114 to which capacitor 120 is connected falls and capacitor 121 discharges exponentially till it reaches a voltage below the reference voltage at the comparator. The comparator output voltage which was high before discharge of capacitor 121 now falls to zero. This output causes a high voltage to appear at the output of inverter amplifier 118 which forward biases a diode 119 so that a voltage appears at the busbar 100 and the relay contacts of relay 82 are opened. It will be noted that when the output voltage of the comparator 115 goes low, the voltage at point 113 goes low thus ensuring that the gate of transistor 23 is held low and therefore no current can flow from the mains through the circuits 1 and 2.

Circuit 78 detects failure of the stabilised voltage supply circuit of FIG. 3 and comprises a comparator 130 having a reference voltage supplied to one input thereof from a chain of resistors 131 and 132 whilst the other input is supplied with the output voltage of an opto-isolator 123 to the input of which is supplied the stabilised voltage output of one of the voltage regulators 54. The reference voltage is higher than this stabilised voltage and to this end the voltage applied to the chain of resistors 121 and 122 is the sum of the stabilised voltage and the voltage applied to opto-isolator 47 of the bridge inverter of FIG. 1. The output of the comparator 130 is supplied to an opto-isolator 124 the output voltage of which provides the base emitter voltage of an n-p-n transistor 125 the output of which developed across a resistor 126 is connected to the busbar 100 by way of a diode 127. The stabilised voltage of one of the voltage regulators is applied to the series path of the collector emitter of transistor 125 and resistor 126.

When the input voltage of the opto-isolator 123 falls below a predetermined level of about one volt below the nominal stabilised level the output current of the isolator falls and the voltage input from the isolator 123 to comparator 130 rises above the reference voltage input thereto. The output voltage of the comparator in these circumstances falls so that the output current of opto-isolator 124 falls. This increases conduction of transistor 127 and the voltage across resistor 126 rises and, forward biases the diode 127 so that a voltage is applied to busbar 100 and the contacts of relay 82 open to interrupt the mains supply to the power modules 80.

It will be apprehended that the heart of the protection circuitry system is the gate 92. Each of the circuits 74 and 76 to 78 provides under failure conditions a voltage at the fail safe busbar 100 which is connected to one input of gate 92 and that voltage effects opening of the contacts of relay 82, whilst circuit 75, when it is desired to turn off the lamp connected to the power modules 80, on pressing of switch 87 or 88, supplies a voltage to another input of the gate 92 which likewise effects opening of the contacts of relay 82 thus depriving the lamp of mains power. When any of the circuits 74 to 78 operate to open the contacts of relay 82, the interruption of the mains supply to the power modules 80 is indicated by illumination of a lamp (not shown) or actuation of some other warning device.

The constant current source 1 and the inverter bridge circuit 2 as well as the chopper oscillator failure detection circuit 74, are together mounted on a single circuit board of rectangular form to provide one of the power modules 80. The board is formed with edge connectors and can be removably engaged along opposite edges thereof in one pair of facing channels or slots in a housing one of the facing channels providing circuit connections complementary with connections on the edge of the circuit board. Similar modules 80 can be fitted into further pairs of facing channels in the housing and when so fitted their input connections 8,9 and 10 and their output connections 42 and 43 are automatically connected in parallel with the like connections of other modules 80 engaged in the housing. The number of power modules engaged in the housing at any time depends on the power rating of the arc lamp to be illuminated.

The circuits 75 to 78, the master oscillator circuit of FIG. 2 and the power supply circuit of FIG. 3 for supplying the stabilised voltages at the various locations mentioned in the circuits of FIGS. 1,2,4 and 5, are together mounted on a single generally rectangular circuit board which has edge connectors and fits into a pair of facing channels of the housing which accommodates the modules 80. When so fitted the requisite connections are automatically made between the chain 65 of components 66 to 71 of the master oscillator circuit and the inverter bridge circuit 2 of the power modules and between the outputs of the voltage regulators 54 and the appropriate points in the circuits of the power modules. The output of the voltage regulator 54 which provides stabilised voltages in the circuits mounted on the protection circuitry circuit board is of course permanently connected to the appropriate points on that board.

We claim:

1. A power supply for an arc lamp, comprising a power source and an inverter, characterized in that the power source is a constant current source for the supply of current to the inverter and comprises, connected in series, a rectifier, a capacitor, an inductor and a field effect transistor, the inverter being connected in parallel with said capacitor so that current supplied from the rectifier to the inverter is drawn through said inductor by said field effect transistor, there being provided a chopper oscillator for controlling conduction of said field effect transistor and means connected to said oscillator and responsive to the current in said field effect transistor so that said oscillator is inhibited to terminate conduction of said field effect transistor when the current therethrough exceeds a predetermined value, whilst the inverter comprises a bridge network of field effect transistors and an oscillator adapted to supply square wave switching pulses to the bridge transistors, whereby the bridge network affords an output current of alternating square pulses of current of equal duration for driving the lamp.

2. A power supply as claimed in claim 1, characterized in that the field effect transistors of the bridge network and the field effect transistor in series with the rectifier are insulated gate devices, the bridge network transistors being supplied from the oscillator with gate to source voltages by way of opto-isolators.

3. A power supply as claimed in claim 1, characterised in that the field effect transistor provided in the constant current source is employed to switch a junction transistor, conduction of which inhibits the chopper oscillator.

4. A power supply as claimed in claim 3, characterised in that there is provided a relay in series with power input terminals of the constant current source and at least one system protection circuit is provided the output of which is connected to a control circuit for controlling closure of contacts of the relay whereby on triggering of the protection circuit the control circuit is actuated to open the relay contacts.

5. A power supply as claimed in claim 4, characterised in that in parallel with the input of the constant current source is provided a series path of a lamp starter and a relay and a latch circuit is provided a first actuation of which closes the lamp starter relay for a period to enable the starter to strike the lamp whilst a second actuation operates the control circuit to effect opening of the contacts of the relay in series with the input terminals of the constant current source.

6. A power supply as claimed in claim 5, characterised in that the control circuit includes a gate having inputs connected to respective outputs of the protection circuit and the latch circuit and an output connected to a semiconductor device, the latter being rendered nonconducting upon an input voltage appearing at the gate thereby to de-energise the relay in series with the constant current input terminals.

7. A power supply as claimed in claim 6, characterised in that a plurality of protection circuits are provided each having its output connected to a busbar in turn connected to an input of the gate.

8. A power supply as claimed in claim 7, characterised in that there is provided a supply circuit for supplying stabilised voltages to the constant current source chopper oscillator, the field effect transistors of the bridge network, the oscillator for supplying square voltage switching pulses to the bridge network transistors and the protection circuits and the protection circuits include a circuit for protecting against failure of said supply for supplying stabilised voltages.

9. A power supply as claimed in claim 8, characterised in that the protection circuits comprise circuits respectively for detecting failure of the chopper oscillator, failure of the bridge network supply oscillator, and for detecting local high temperature.

10. A power supply as claimed in claim 1, characterised in that the constant current source and bridge network are mounted on a single circuit board and constitute a power module for parallel connection of the current source input terminals and bridge network output terminals with corresponding terminals of one or more further like power modules.

11. A power supply as claimed in claim 10, characterised in that the oscillator for the supply of square voltage switching pulses to the bridge network is mounted as a module on a circuit board which is adapted for connection to the power modules to serve as a common oscillator for the field effect transistor bridge networks thereof.

12. A power supply as claimed in claim 11, characterised in that the common oscillator module further carries a plurality of system protection circuits, a supply circuit for supplying stabilised voltages to the constant current source, the common oscillator, the bridge network and the protection circuits, and a control circuit adapted upon triggering of any of the protection circuits to disconnect the mains power supply from the power modules.

* * * * *